United States Patent [19]

Pusic

[11] Patent Number: 5,025,386

[45] **Date of Patent: * Jun. 18, 1991**

[54] AUTOMATED MAIL COLLECTING AND TELECOMMUNICATION MACHINE II

[76] Inventor: Pavo Pusic, Moluntska 6, Dubrovnik, Yugoslavia, 500000

[ * ] Notice: The portion of the term of this patent subsequent to Feb. 13, 2007 has been disclaimed.

[21] Appl. No.: 262,029

[22] Filed: Oct. 25, 1988

Related U.S. Application Data

[63] Continuation-in-part of Ser. No. 226,778, Aug. 1, 1988, Pat. No. 4,900,905.

[51] Int. Cl.[5] .......... G06F 15/20

[52] U.S. Cl. .......... 364/478; 364/466; 364/464.02

[58] Field of Search .......... 364/464.02, 478, 519, 364/464.03, 464; 235/375, 432, 495, 494

[56] References Cited

U.S. PATENT DOCUMENTS

| | | | |
|---|---|---|---|
| 4,024,380 | 5/1977 | Gunn | 364/478 |
| 4,439,636 | 3/1984 | Newkirk et al. | 179/7.1 R |
| 4,511,793 | 4/1985 | Racanelli | 364/466 |
| 4,722,430 | 2/1988 | Canziani | 198/370 |
| 4,756,399 | 7/1988 | Scata | 209/900 |
| 4,796,193 | 1/1989 | Pitchenik | 364/464.02 |
| 4,800,506 | 1/1989 | Axelrod et al. | 364/478 |
| 4,802,218 | 1/1989 | Wright et al. | 380/23 |
| 4,837,701 | 6/1989 | Sansone | 364/466 |
| 4,853,869 | 8/1989 | Durst, Jr. et al. | 364/464.02 |
| 4,878,574 | 11/1989 | Ritter | 198/369 |
| 4,900,905 | 2/1990 | Pusic | 235/381 |

*Primary Examiner*—Michael R. Fleming

*Attorney, Agent, or Firm*—Kenyon & Kenyon

[57] ABSTRACT

The present invention discloses an automated mail collecting machine comprising the functions of an automated, electronically controlled postage meter having a bar code printer, a pay-phone device, a data listing device, and a telex sending device. The incorporated functions are used independently for different purposes while being operated directly by a customer and all applying the same automated means. The machine's process is guided both by instructions from its program memory and instructions from its input means which are operated by the customer according to displayed instructions during each different stage of the machine's processes. Even though the predetermined automatized processes are guided by the machine's program memory for all of its functions, the payment mode is dependent on each individual customer's choice. Furthermore, the machine's automatized processes can refuse to perform any of the services at any stage of the process without the possibility of a loss by either the customer or the owner. The refusal means and means to prevent improper handling are provided in order to enable the machine's continuous use in any public place where it may be installed.

19 Claims, 19 Drawing Sheets

D2000013RC00A
SEPT 21 1988

US07936
SEPT 21 1988

Fig. 18.
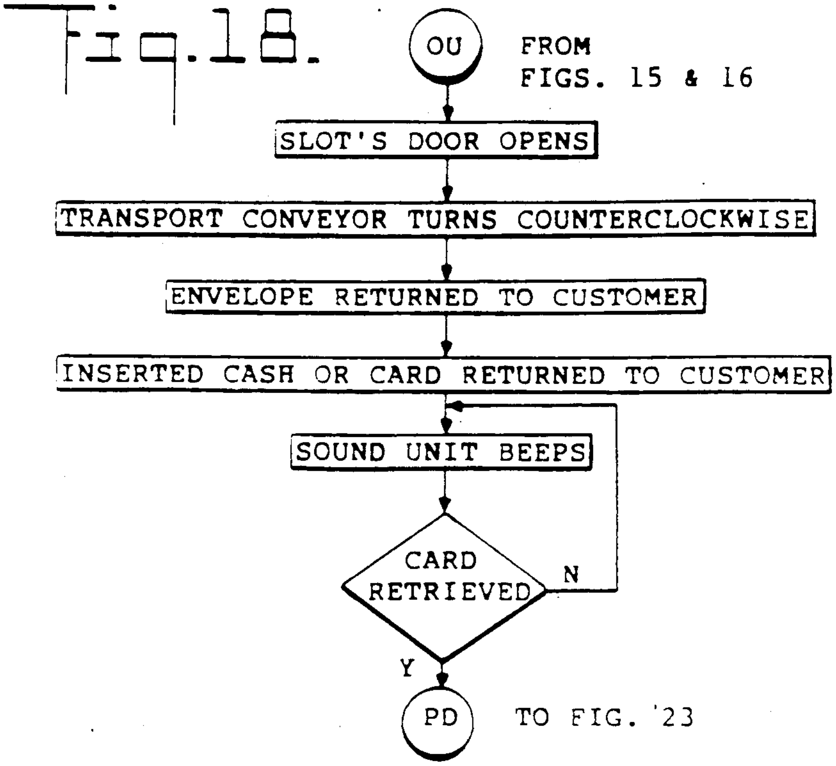
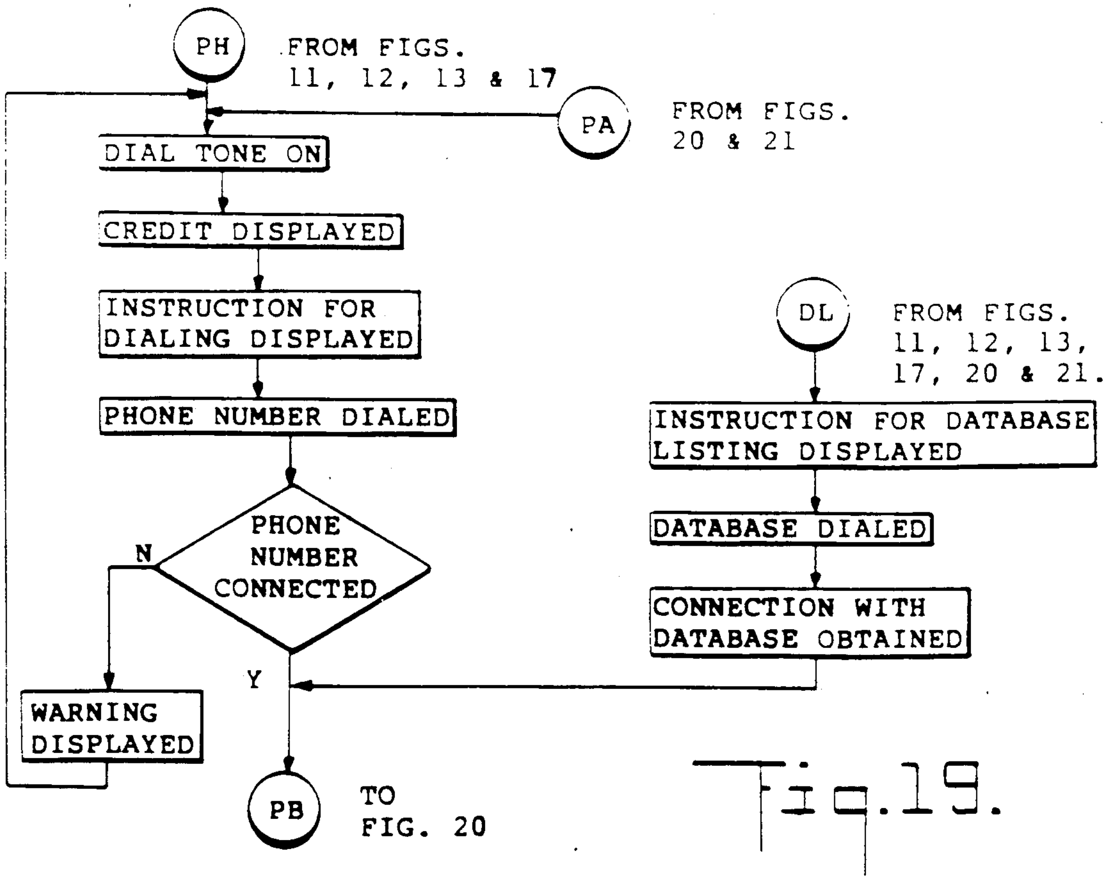
Fig. 19.

AUTOMATED MAIL COLLECTING AND TELECOMMUNICATION MACHINE II

This is a continuation-in-part of my prior copending application Ser. No. 07/226,778, filed Aug. 1, 1988, now U.S. Pat. No. 4,900,905.

The present invention relates to electronic postage meters of the type having a microprocessor for controlling envelope stamping and the accounting for such stamping, and for the efficient and economical franking of letters. It also relates to motorized weighing conveyors mounted on an electronic weighing device and to electronic scales with the ability to print bar code labels. It further relates to printers able to print data entered on an alphanumerical keyboard in the form of laser readable bar code and to vending machines with the ability to accept payment in coins, bills, and debit, credit, or IC cards. It also relates to coin, and debit, or credit card operated pay-phones, various devices used for the listing of data from some external database, and to telex machines.

The present invention relates to my copending U.S. patent application Ser. No. 226,777, filed Aug. 1, 1988, entitled "Automated Electronic Postage Meter Having a Direct Access Bar Code Printer."

BACKGROUND OF THE INVENTION

An object of the present invention is to provide an automated machine for the collection and stamping of mail. Electronic postage metering and stamping machines will be discussed first. Conventional postage metering and stamping machines have the ability to electronically weigh envelopes, package mailings, and to stamp the postage on an envelope. They are operated by an employee and the postage is determined according to the envelope's weight and its destination. The postage can either be debited from the machine's previously charged non-volatile memory or paid in cash to the employee when the machine is used in postal offices. These machines do not significantly affect the further sorting and tracking process.

Only machines which are able to print a horizontally oriented clocked code on an envelope significantly improve the sorting process but due to the nature of the horizontally oriented clocked code, they cannot improve the tracking process or be used for international mail traffic. Furthermore, their process requires a relatively slow procedure because the horizontally oriented clocked code has to be printed fairly precisely in relation to an envelope's lower edge to be sure that both the clock and the information track line-up with their appropriate reading head during the scanning process. This scanning process can be performed only by photosensitive transducers which provide relatively slow, single-pass scanning with a relatively low first read rate ratio.

Hence, another object of the present invention is to improve the entire mailing process from the point of acceptance to the point of delivery for almost all kinds of postcards, envelopes, and packages, referred to as "a" or "the" "mailing" in this text. The advantages of the invention will be listed further. The present invention enables mail collecting procedures to be performed directly by a customer who inserts the mailing and manually enters the instructions and data on a keyboard by following the displayed instructions. Therefore, there is no need for any employees to operate the present invention. According to the process of the present invention, a customer himself chooses and performs the payment procedure by using one of the possible payment modes. The machine can also be installed anywhere for the most convenient and continuous customer usage.

The present invention enables the electronic weighing of a mailing to be performed automatically and securely, without the possibility for a customer to influence the weighing, and the postage is automatically calculated according to the mailing weight data and the destination data entered on the keyboard. Therefore, according to the process of the present invention, there is no possibility for a higher or lower postage being calculated and since each mailing can be returned to the customer in the case of insufficient postage paid or data entered, no further check as to whether the postage was paid is necessary.

Having the ability to convert the entered data about the destination of a mailing and any special requests and print it in a form of laser readable bar code directly on a mailing, the present invention enables the entire further sorting and tracking process to be performed by automated means. By using multidirectional scanners, built-in on both sides of the mailing path at the sorting hubs, each mailing can be sorted and tracked, when required, without any manual labor involved and with extremely high speed and an almost 100% first read rate.

In accordance with the present invention, when the destination zip code is printed on a mailing in a form of said bar code, the mailing can be automatically sorted all the way to the point of delivery by passing through the different sorting hubs. A Zip – four code can also be applied and when an alphanumeric type of bar code is used, the mailing can be sorted and tracked in international mail traffic. This assumes that the part of the printed bar code showing the mailing's zip code is printed in numerals and that the part of the bar code showing the country code is printed in letters so that a combination of two letters represents the country code of each respective country.

When the mail is sent to countries with an alphanumeric zip code, the bar code is printed on the mailing with the letters and numerals arranged according to how they were entered in on the machine's keyboard. When any of the possible special requests are entered, an identification code in numerals is automatically printed together with the type of special request which information is printed using a letter or letters on the same line with the country and zip code. Considering the advantages in the speed and accuracy of sorting and tracking mailings when laser readable bar code is used therefor, the advantages of the present invention are obvious to those skilled in the art.

Yet another object of the present invention is to provide a pay-phone device for public use. First, conventional pay-phones will be discussed. Presently, pay-phones for public use are designed to accept payment means, such as coins, and debit or credit cards, and most of them are able to accept only one out of the three said means. It is an object of the present invention to provide a device wherein coins, bills, debit cards, different kinds of credit cards, and IC cards can be used to pay the charge by using the same payment accepting means as is used for the mail collection purpose. According to the present invention, the same displaying and processing means are used and this enables the device to be economical while giving the customer all possible options of mode of payment.

Still another object of the present invention is to provide a device for listing the data of, and entering into some external database. Various kinds of databases are available for the listing and entering of data using various means, mostly by connecting existing home or corporate PCs and using them as terminals to list the data available in a certain database for a certain predetermined charge.

Therefore, an object of the present invention is to provide a device which will make the data from some external database available to the general public. In accordance with the present invention and by using the same payment accepting, displaying, printing, and processing means as those used for the machine's other purposes, a continuous, convenient, and economical data listing and data entry operation can be obtained. A variety of data can be listed, such as data from a phonebook, a Yellow Pages, a Thomas Register, weather report data, and train, bus, and plane schedules, etc., and in addition to getting a listing, a customer can be allowed to enter data into the database for certain purposes, such as for making reservations, etc.

A further object of the present invention is to provide a device where, when the device is connected to a telex line, a telex message can be sent by using the same procedure as that used in an existing telex machine, with the difference that the message is not printed and dispensed to the customer if this is not specifically requested. In accordance with the present invention, a message entered on a keyboard is memorized and, upon confirmation of payment for a calculated and displayed charge, sent on. This enables the general public to send messages whenever desired to any connected telex and since the same data entry, payment acceptance, display, printing, and processing means as for the machine's other purposes are used, this procedure also becomes very economical.

It is yet a further object of the present invention to provide a device including the functions of an automated electronic postage meter, a pay-phone, a capability for listing the data from an external database and for providing entry into said database, and a telex sending machine which device can be simply operated by a customer and installed anywhere for continuous public use.

SUMMARY OF THE INVENTION

In order to achieve the objects of the present invention, there are provided means for accepting payment, either in coins, bills, or debit, credit, or IC cards, means for entering any required data, means for displaying said data and the instructions for the use of the machine during the different phases of the process, means for printing, dispensing, processing, and storing the required data, wherein all said means are used for all of the machine's various functions. There are also provided means for the inserting, driving, pressing, bar code printing, and the storing of the mailing, used for the machine's mail collection purpose which is one object of the present invention.

For use as a mail collecting apparatus and according to the present invention, the machine is able to accept postcards, envelopes, and postal packages, weigh them by an electronic means, print destination data on them in a chosen form of laser readable bar code for the purposes of later completely automatically sorting and tracking the mailing, and store them for subsequent pick up.

One of the objects of the present invention is the use of the machine as a pay-phone device which would accept the payment of any charges by all the previously discussed payment means. For this purpose, the machine has to be connected to a telephone line which is also used as the connection to any external databases when the machine is used as a data listing device, which is yet another object of the present invention.

When used as a telex sending device, which is a further object of the present invention, the machine has to be connected to a telex line.

According to the process of the present invention, there is the possibility for a "follow on" procedure in a situation when another service is to be paid for by the same customer and the machine is able to refuse any of the services when necessary due to improper handling, insufficient data entered, or insufficient payment made without a loss either to the customer or to the machine's owner.

The features and advantages of the present invention will become apparent from the following brief description of the drawings and a detailed description of the invention.

BRIEF DESCRIPTION OF THE DRAWINGS

FIGS. 11 to 23 are flow charts showing the process of the machine as disclosed by the present invention.

DETAILED DESCRIPTION OF THE INVENTION

Regardless of the fact that for mail collection purposes the present invention can be installed as a completely independent unit, its processes will be described on the assumption that the machine is connected to telephone and telex lines.

Each of the machine's processes will be separately described according to the following order:

use of the machine for mail collection purposes;
use of the machine as a pay-phone device;
use of the machine as a data listing and data entering device;
use of the machine as a telex sending device.

Figure 1:
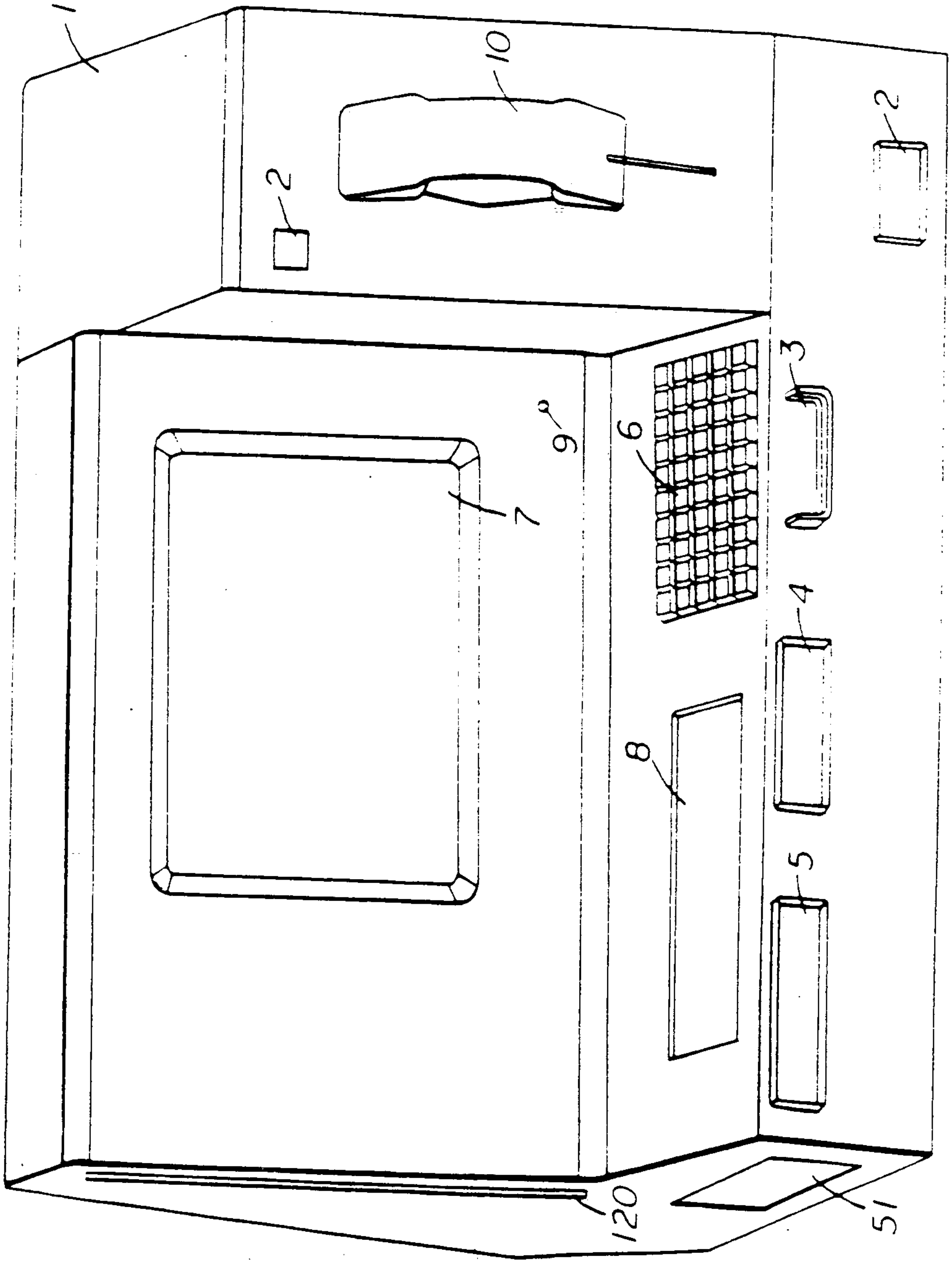
FIG. 1 is a perspective view of the machine housing showing the outside arrangement of its parts as disclosed by an embodiment of this invention.
Figure 2:
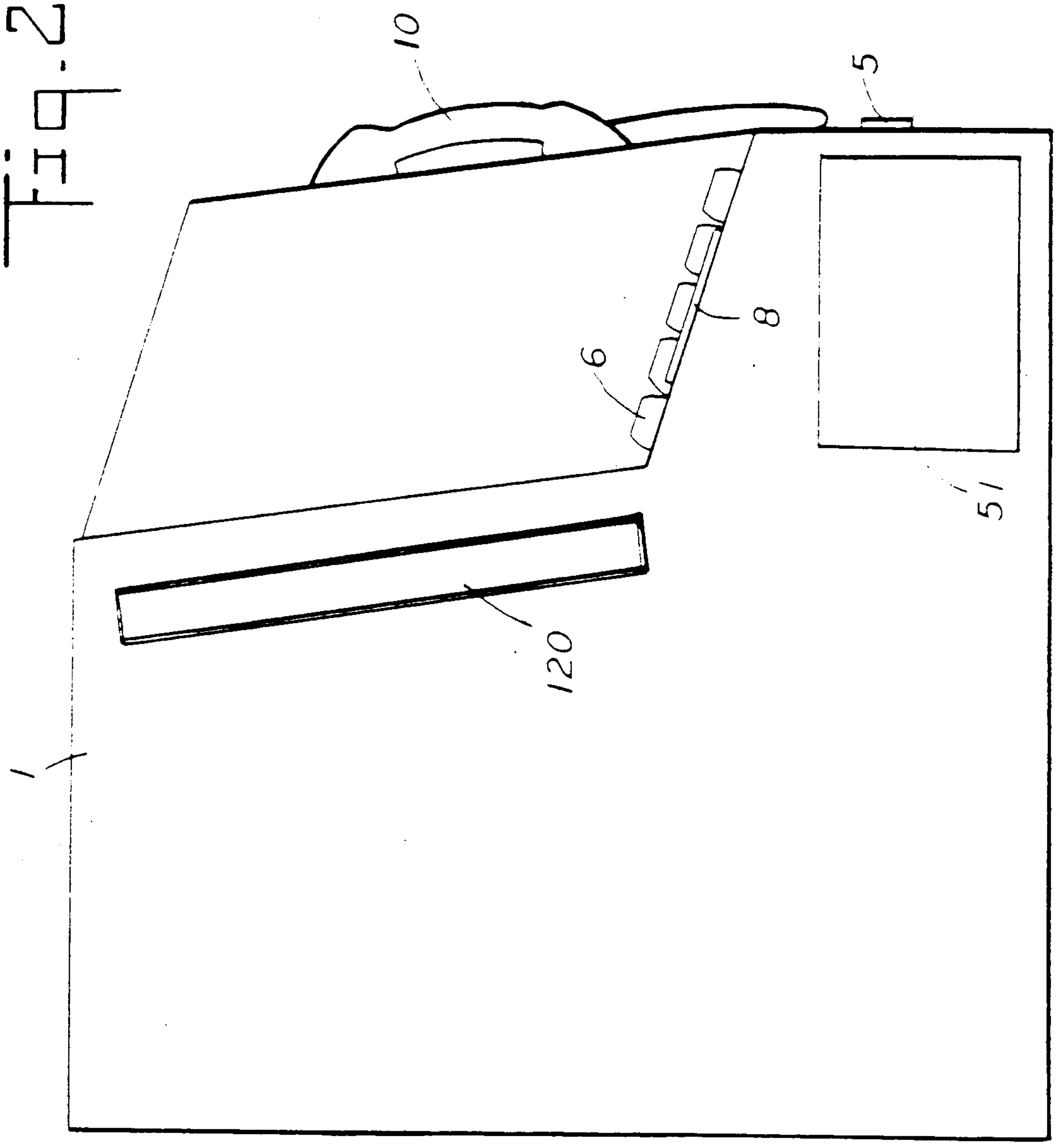
FIG. 2 is a left side view of the machine housing showing the insertion slot's sliding door, dot matrix printer opening, liquid crystal display ("LCD"), keyboard and phone handle.

Referring specifically to the drawings, FIG. 1 illustrates one embodiment of the present invention. With reference to FIG. 1 and in accordance with the invention, there is provided a coin changer 2 with escrow to vend/escrow to select ability, a bill acceptor/validator 3 with escrow to vend/escrow to select ability, a magnetic and IC card reader/writer 4, a dot matrix printer 5 with an opening 51 for refilling with paper and ribbon, an alphanumerical keyboard 6, a liquid crystal display (LCD) 8, a transparent glass window 7, a phone handle dialing unit 10, and an insertion slot's sliding door 120 all built into machine housing 1.

Figure 11:
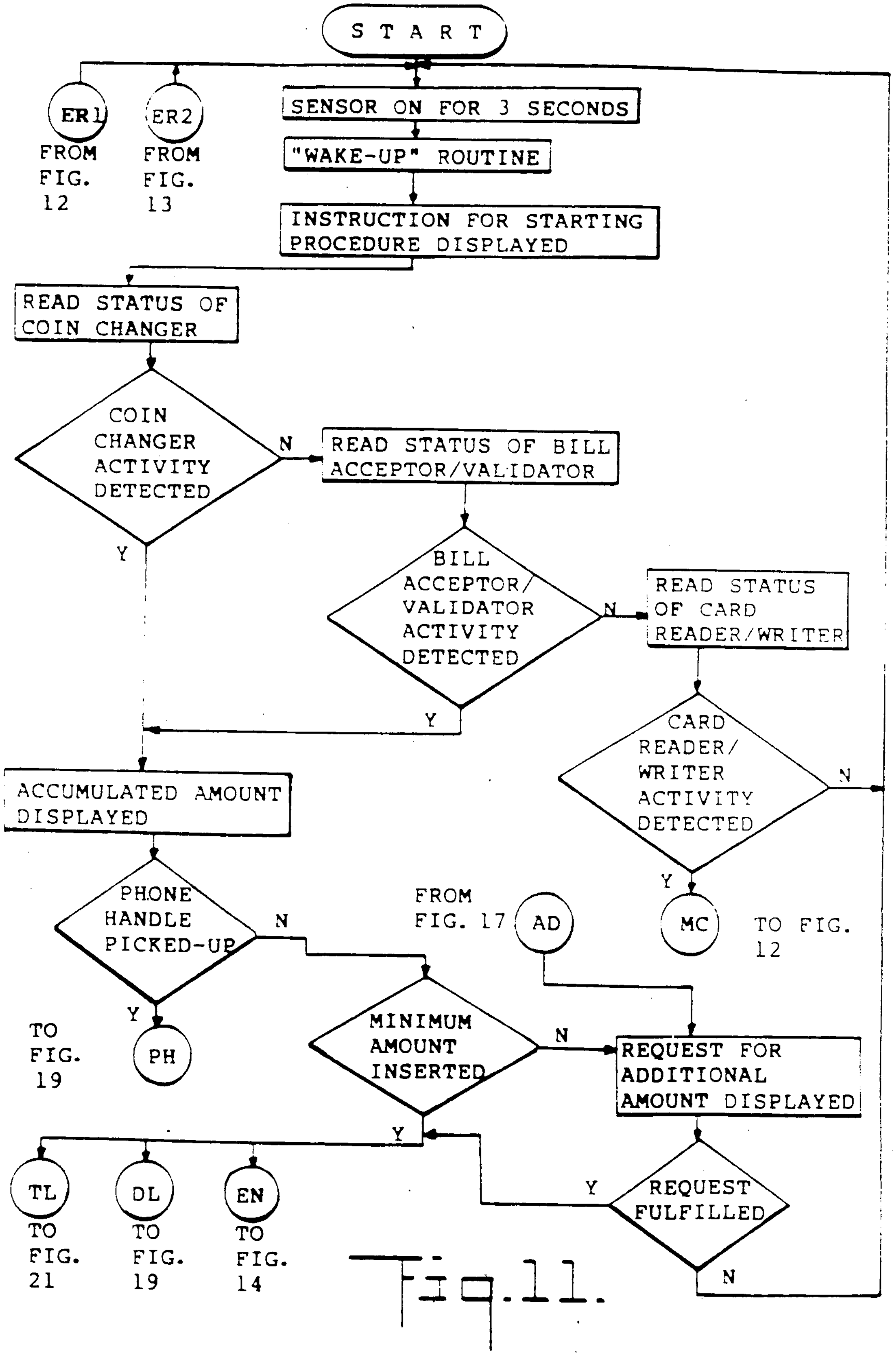

Referring now to FIGS. 1 and 11, the machine's front-placed photo sensor 9 is also built into machine housing 1 and upon detecting a person standing in front of the housing 1 indicates this to the machine's central processing unit ("CPU") 32 which causes a wake-up routine to occur. First, instructions for the starting procedure are displayed on the machine's LCD 8. These instructions include information on how a minimum amount in coins, bills, magnetic cards, or IC cards is to be inserted and how to enter commands which select the desired machine function.

As shown in FIG. 11, CPU 32 starts by reading the status of the coin changer 2 and if changer 2 activity is detected, the accumulated amount in escrow is counted, the information is loaded into temporary memory unit 34, and the balance is displayed on LCD 8. If no changer 2 activity is detected, CPU 32 reads the status of the bill acceptor/validator 3, which upon bill insertion automatically checks the bill's validity and, if the bill is valid, drives it into escrow. If this is the case, the bill is held in escrow, the accumulated amount is counted, the information is loaded into temporary memory unit 34, and the balance is displayed on LCD 8. If after a reasonable period of time the amount in escrow, either in bills or in coins, is still lower than requested, a request for additional fund insertion is displayed. If within a reasonable period of time an additional amount is not inserted, the amount in escrow is returned and the machine goes back to the starting procedure as shown in FIG. 11.

Figure 12:
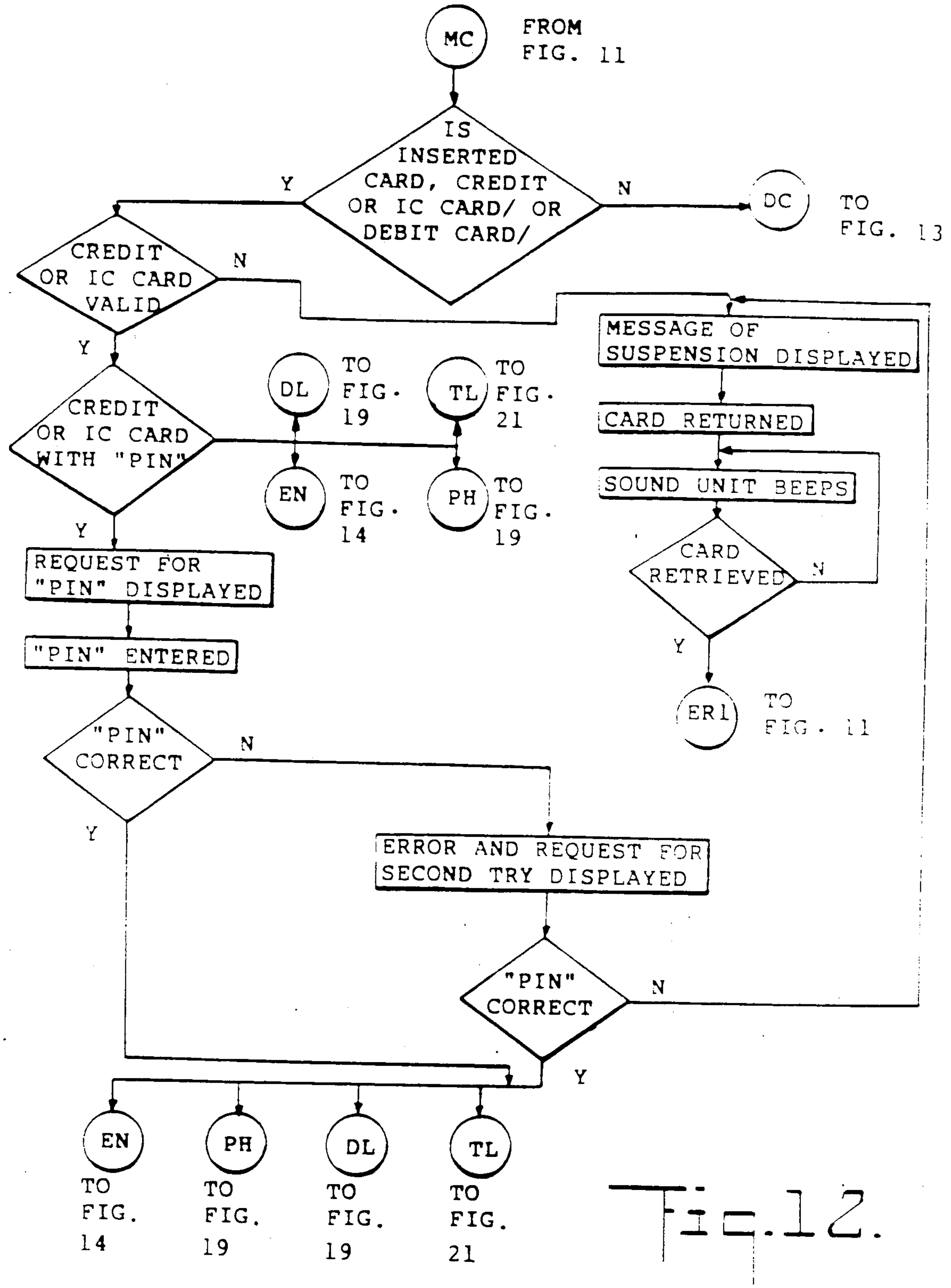

If neither coin changer 2 nor bill acceptor/validator 3 activity is detected, the status of the magnetic and IC card reader/writer 4 is read, as shown in FIG. 11, and if any card is inserted, the procedure is continued, as shown in FIG. 12, to identify what kind of a card was inserted. If the inserted card is identified as a credit card, the machine checks the card's validity and if it is not valid returns it by the procedure shown in FIG. 12. The procedure further includes a check of whether the card is one with or without a PIN (Personal Identification Number). If the card has a PIN, a request to enter the PIN is displayed. The customer gets two chances to enter the correct corresponding PIN on keyboard 6 and if after the second try the correct PIN is not entered, the card is returned and the process is suspended as shown in FIG. 12. When a valid credit or IC card and a correct PIN are entered, the card is kept inside the reader/writer 4 until the entire process is completed.

Figure 13:
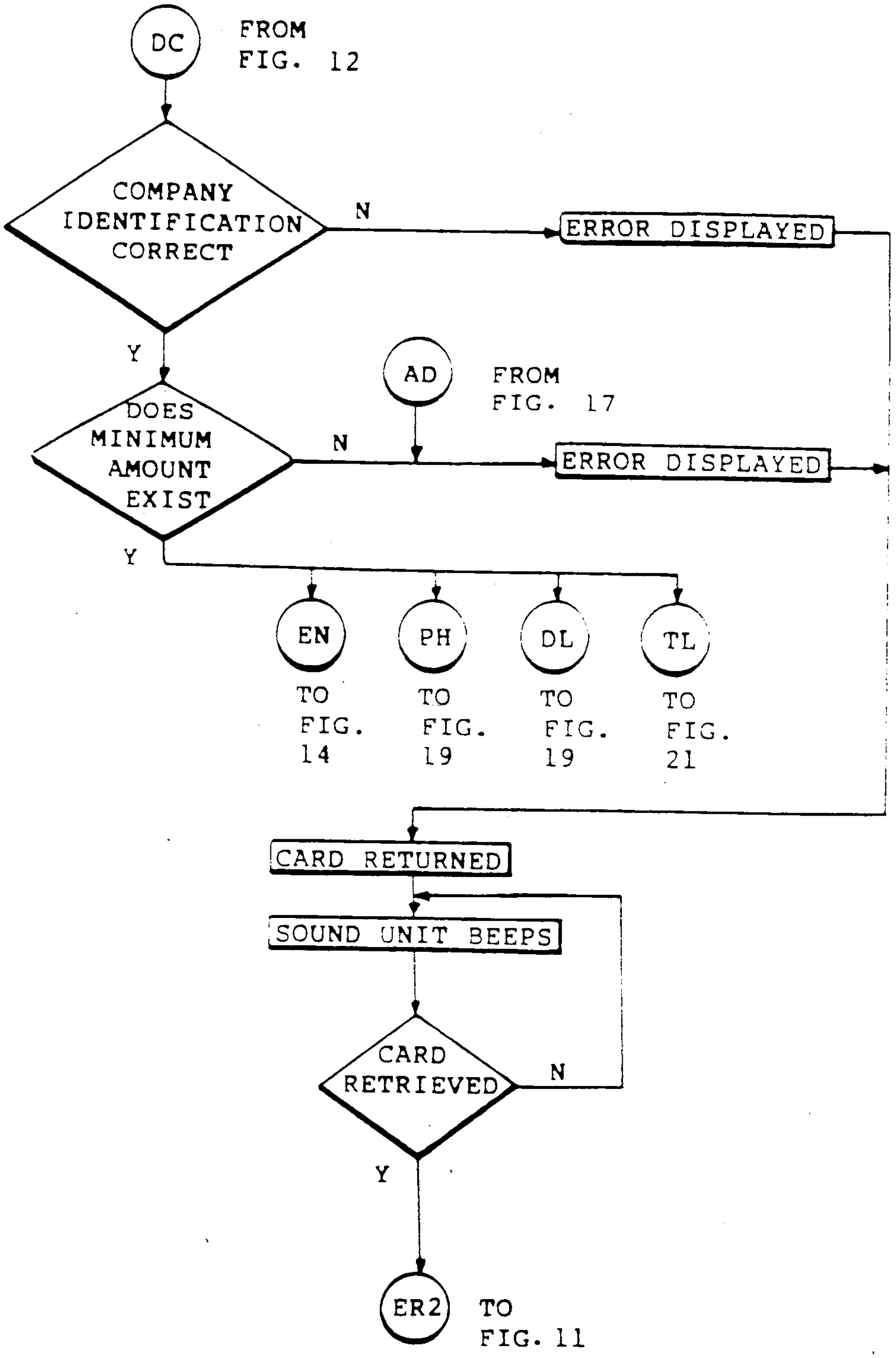

If the inserted card is identified as a debit card, the company identification is checked and, if correct, the machine continues the procedure by checking whether a minimum amount exists on the card as shown in FIG. 13. If a minimum amount exists, the machine enables the process to continue, holding the card until the process is finished. If, however, any of the checks do not comply with the requirements, the card is returned and the process is suspended as shown in FIG. 13. After any initial minimum amount requirement is satisfied, the machine can continue the process for any of the machine's functions. The mail collection process will be described first.

Figure 3:
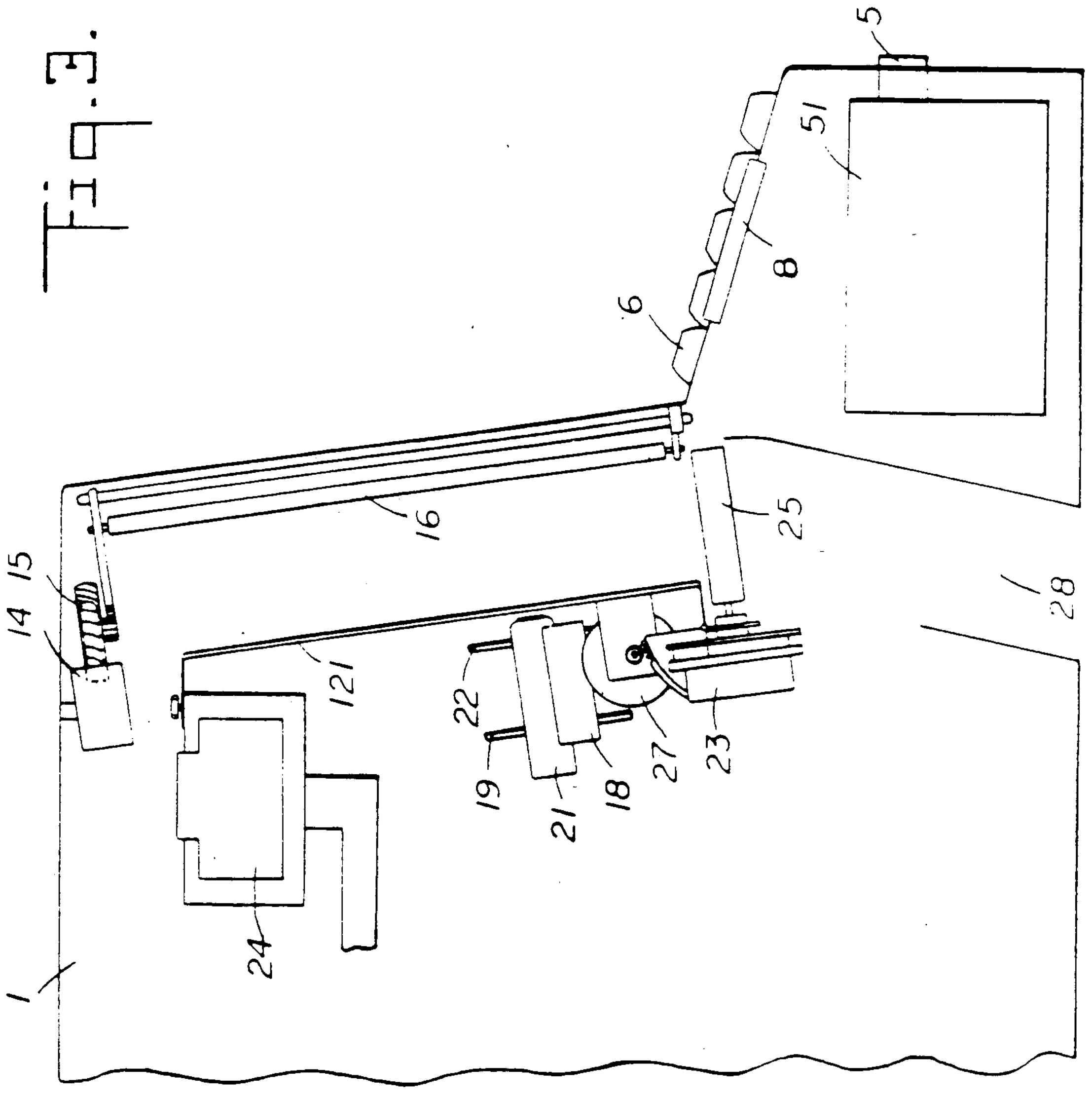
FIG. 3 is a left side view of the machine's inside mechanisms, showing the mailing pressing mechanism, electronic scale device, insertion slot's rear wall, thermal transfer printing mechanism, transport conveyor mechanism, mailing drop, dot matrix printer, LCD and keyboard.
Figure 4:
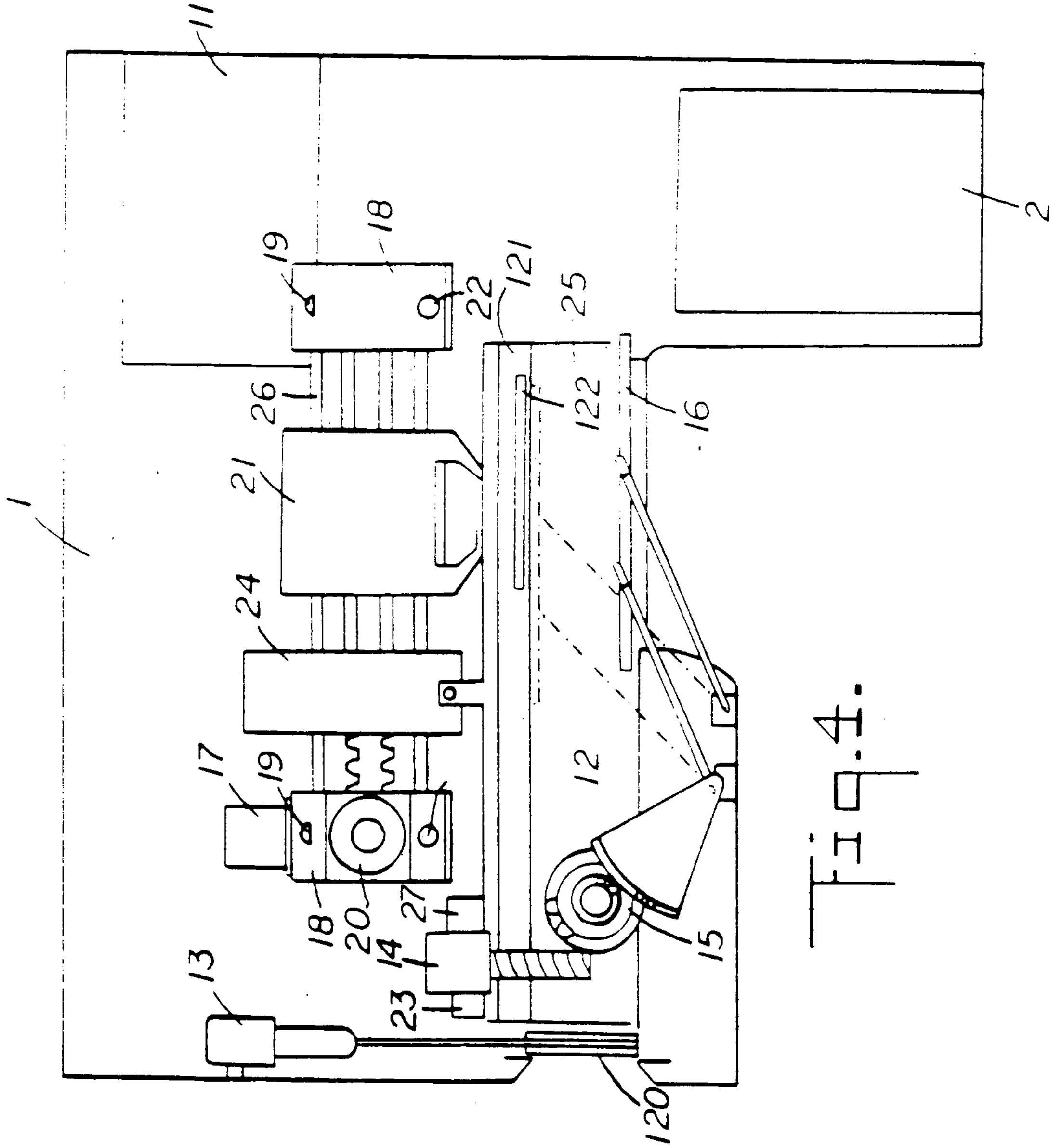
FIG. 4 is a top view of the machine's inside mechanisms.
Figures 5, 5A:
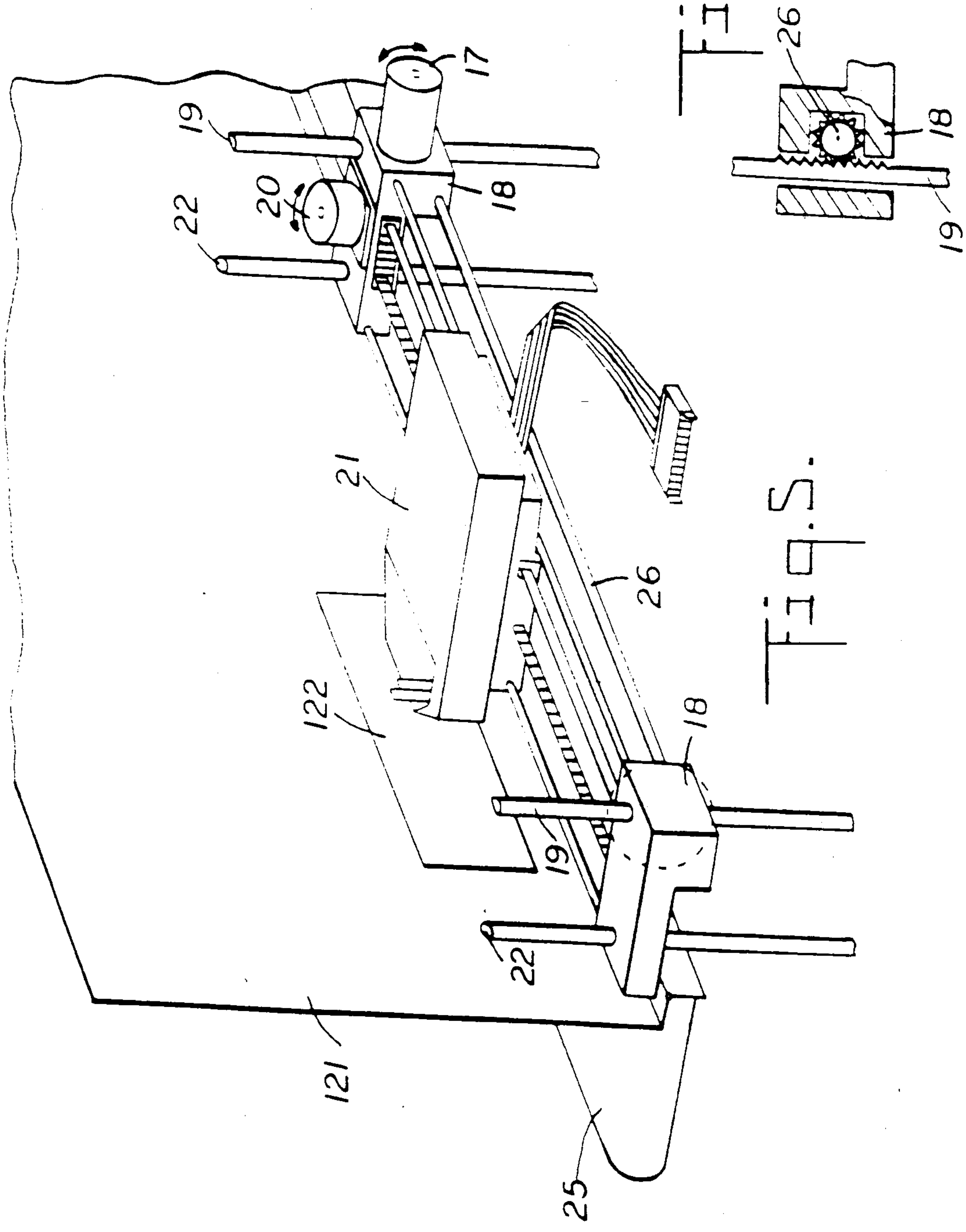
FIG. 5 is a perspective view of the thermal transfer printer configuration located behind the insertion slot's rear wall.
Figure 6:
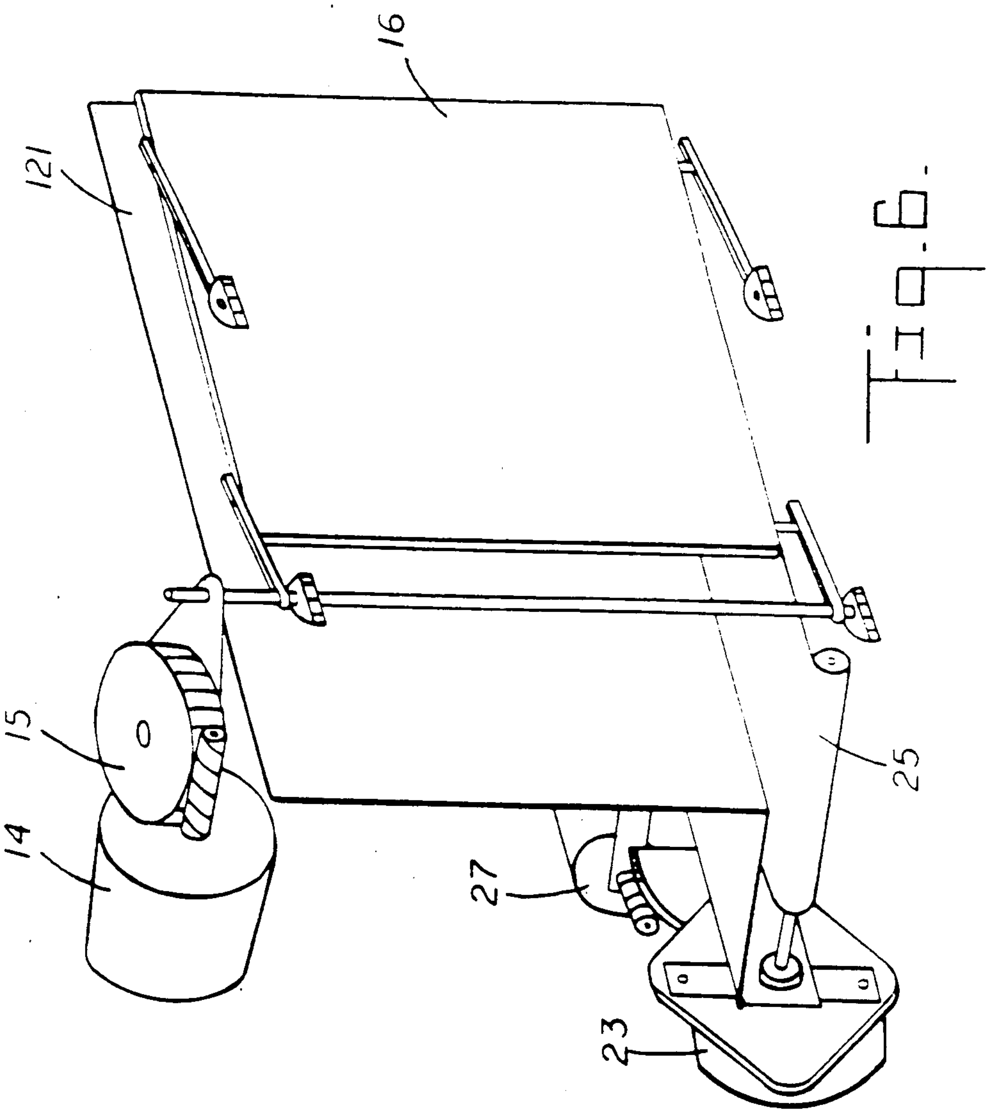
FIG. 6 is a perspective view of the mailing pressing mechanism and transport conveyor mechanism.
Figures 7, 8, 9:
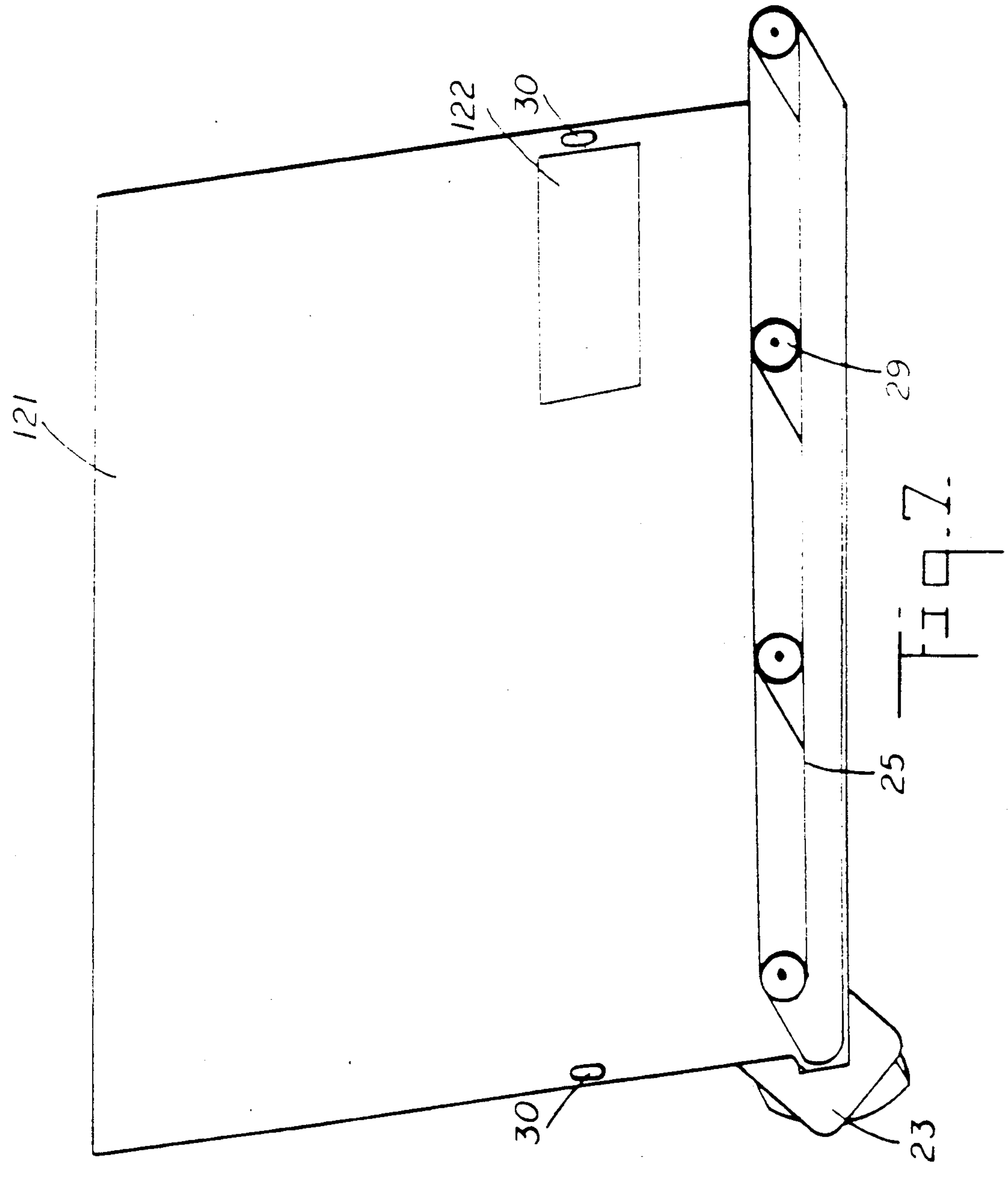
FIG. 7 is a perspective view of the insertion slot's rear wall, loading photosensors and transport conveyor mechanism.
FIG. 8 is an example of a bar code as it would be printed on a mailing sent abroad, i.e., to Hamburg in the Federal Republic of Germany by registered mail, having the country of destination code (D for FRG), zip code (2000 for Hamburg and 13 for certain section in Hamburg), special request code (R for registered mail) and numeral-letter combination (000A for mailing identification).
FIG. 9 is an example of a bar code as it would be printed on a mailing sent by regular mail to East Hanover, N.J., U.S.A., having the country of destination code (U.S. for U.S.A.) and zip code (07936 for East Hanover).
Figure 10:
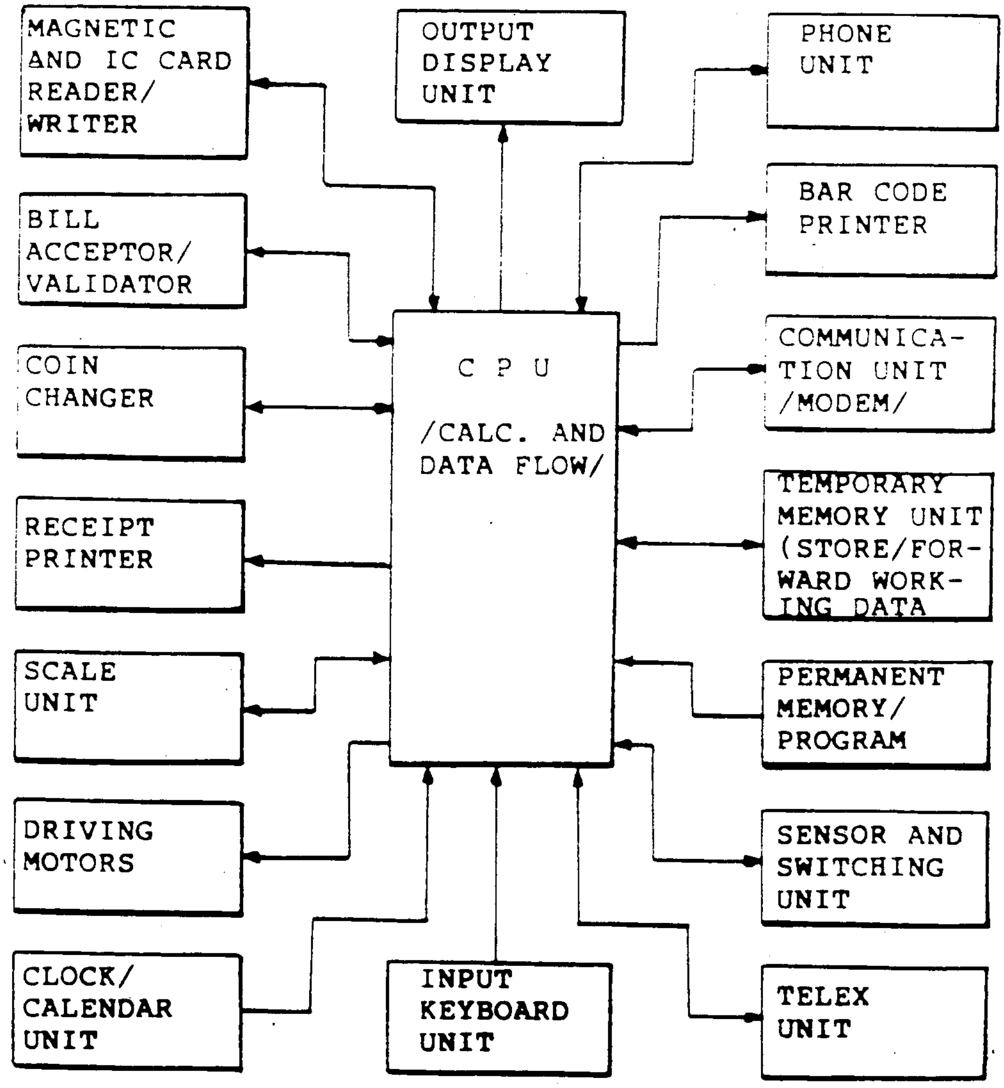
FIG. 10 is a block diagram of the machine in accordance with the present invention.
Figure 14:
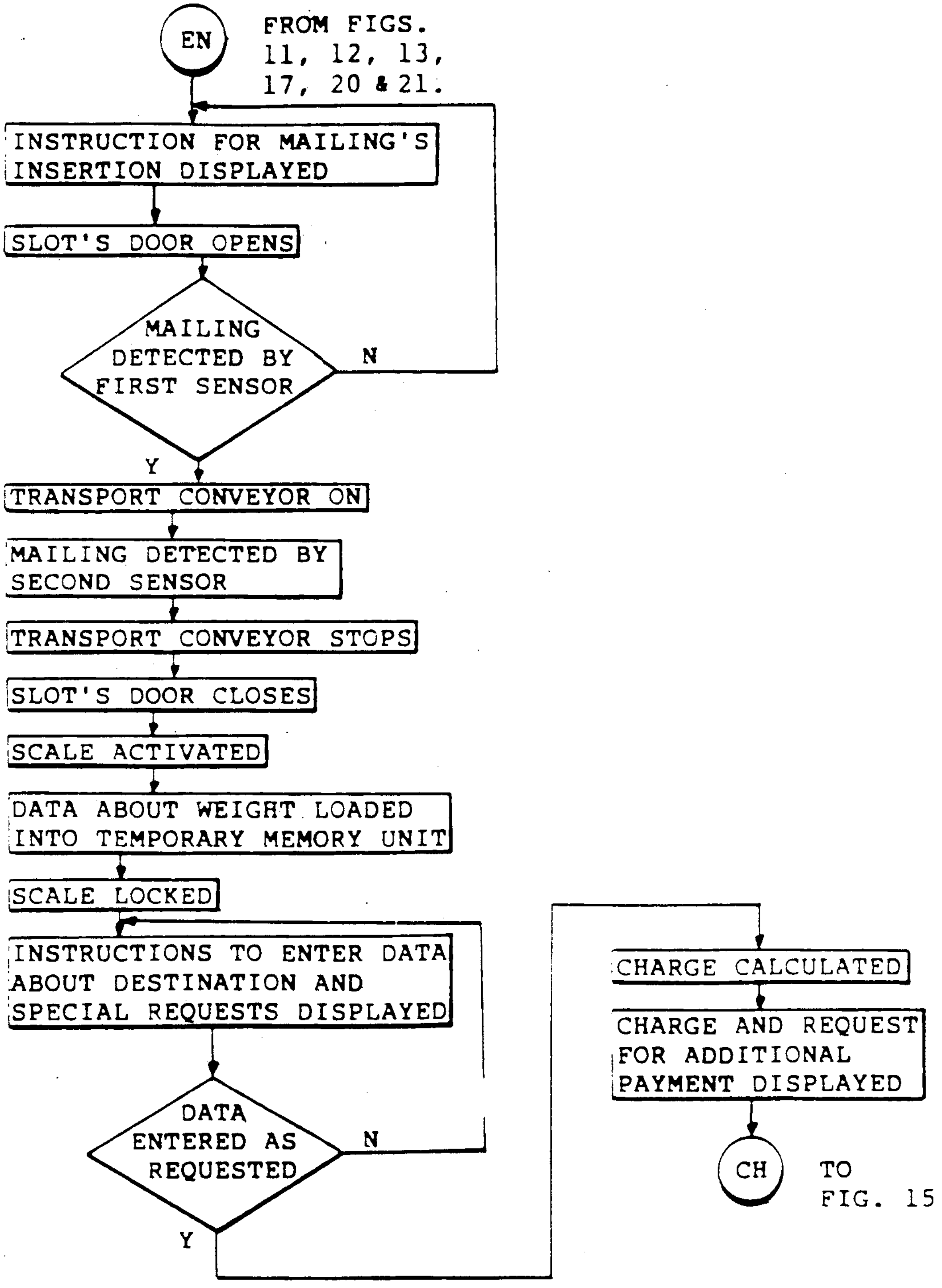

Referring now to FIGS. 1, 4, and 14, if a customer enters an instruction that the mail collection process is desired, the instruction on how to insert a mailing is displayed on LCD 8 and the solenoid 13 opens the insertion slot's sliding door 120 as shown in FIG. 4. The customer then inserts the mailing into the scale insertion slot 12, FIG. 4. When the loading photosensor 30, FIG. 7, detects the incoming mailing, electric motor 23 is activated to drive transport conveyor 25 which turns over its transmission cylinders 29, FIG. 7, and carries the mailing toward the right border of the insertion slot 12. When the second loading photosensor 31, FIG. 7, detects the mailing's edge, electric motor 23 stops, thereby causing transport conveyor 25 to stop leaving the mailing positioned in front of the printing window 122, as shown in FIGS. 4, 5 and 7, and behind the mailing pressing panel 16, as shown in FIGS. 3, 4 and 6.

According to the physical configuration of the present invention, the insertion slot 12, transport conveyor mechanisms 23, 25, 27, and 29, and the mailing pressing mechanisms 14, 15, and 16 are all mounted on insertion slot's rear wall 121 which is hung on electronic scale device 24 so that they do not influence the weight calculation of the mailing during the mailing procedure. When the transport conveyor 25 stops, the scale weighing device 24 is activated and the mailing weight data is then loaded into the temporary memory unit 34. Simultaneously, instructions on how to enter the required data about the mailing's destination on keyboard 6 are displayed and the customer has to enter this data. The customer can read this data from the face of the mailing because the mailing has to be inserted in such a way that the address written on its face comes behind transparent glass window 7 and transparent mailing pressing panel 16 and can be read from outside of the machine after the mailing is driven inside the insertion slot 12.

Figure 15:
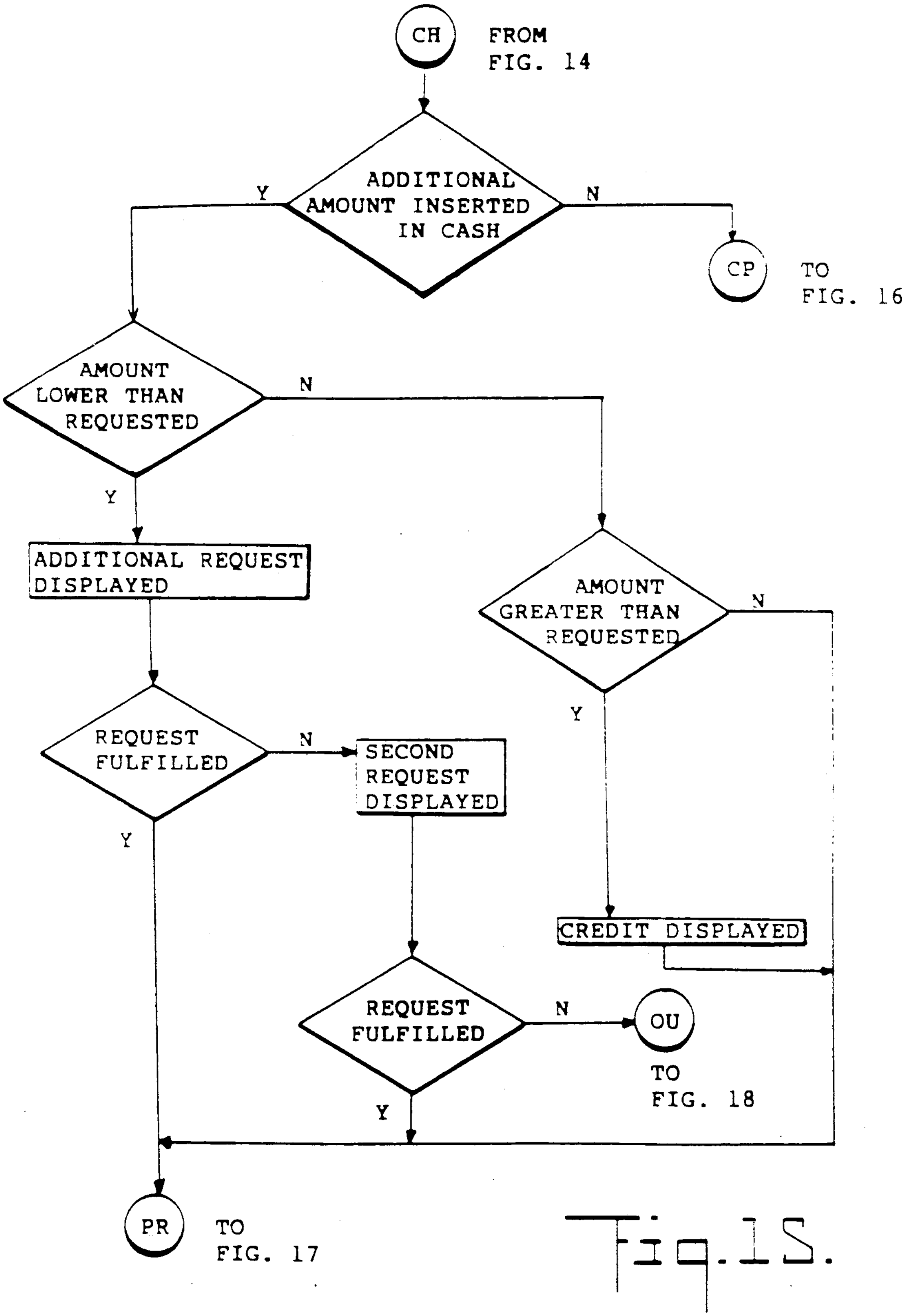

The data to be entered on keyboard 6 may comprise the mailing's country of destination, the zip code, and a variety of special requests such as registered mail, express mail, etc., or any other data required by company standards. Referring now to FIG. 14, according to the data about the mailing weight, the data about the destination and about any special requests, and based on any instructions stored in the machine's memory, a charge is calculated and displayed together with a request for an additional payment if the amount in escrow is not sufficient to cover the charge. As shown in FIG. 15, the customer is asked to insert an additional amount and if the request is not fulfilled after a second displayed warning, the mailing and any already inserted cash are returned. According to this procedure, and as shown in FIG. 18, the transport conveyor 25 is rotated counterclockwise to drive the mailing out of insertion slot 12 through insertion slot's sliding door 120 which is opened by its solenoid 13.

Figure 16:
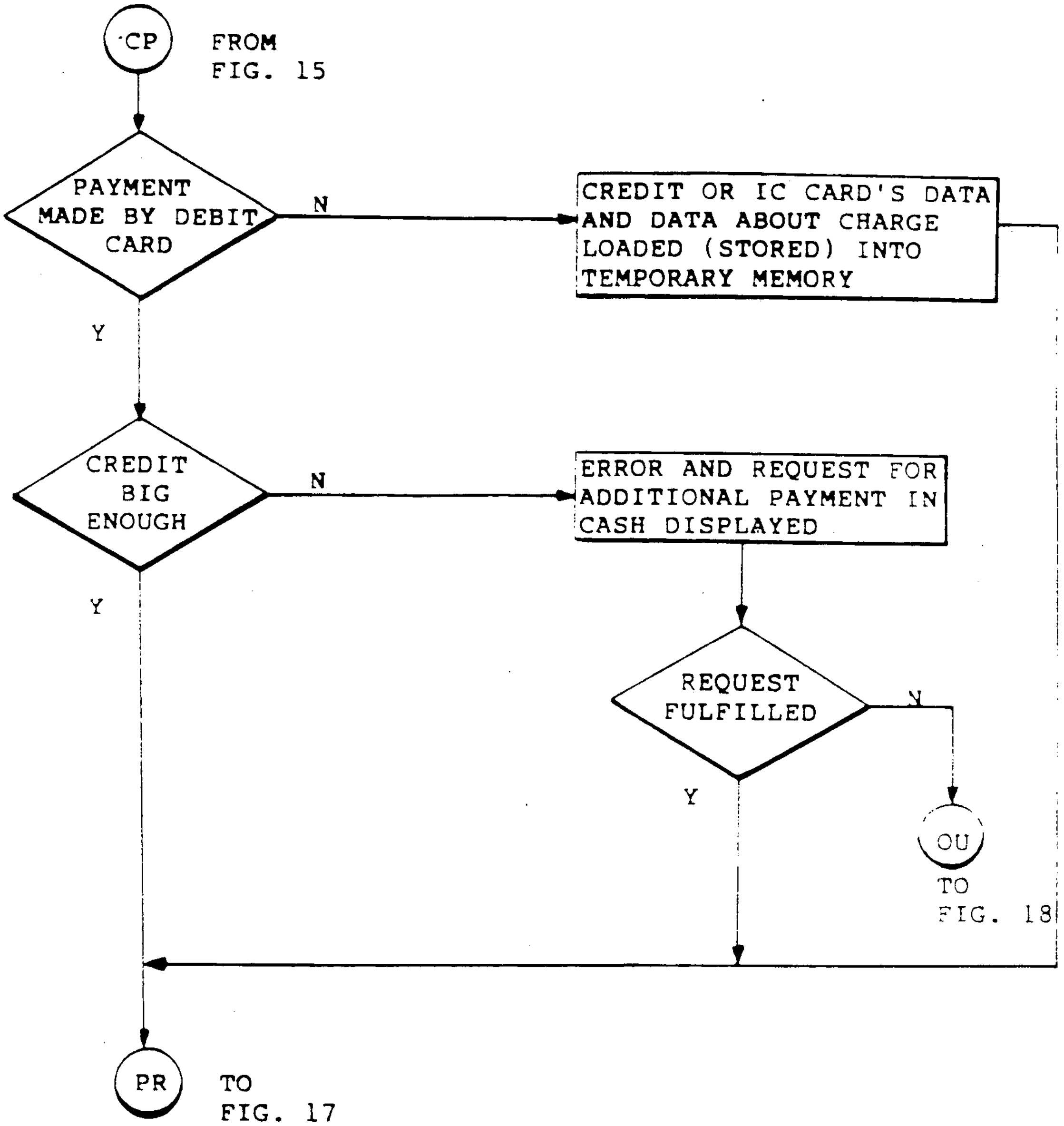

If the charge is to be paid by a magnetic card, the machine continues the procedure as shown in FIG. 16. If the existing credit on the debit card is not sufficient, an additional amount can be inserted in cash or paid by a new debit card after the first card is debited to zero. If, however, the request is not fulfilled, the machine continues the above described returning procedure as shown in FIG. 18. For payment with a credit or IC card, as shown in FIG. 16, the data about the card and any corresponding charge is loaded into temporary memory unit 34 in order to be stored and forwarded for the purposes of later billing.

Figure 17:
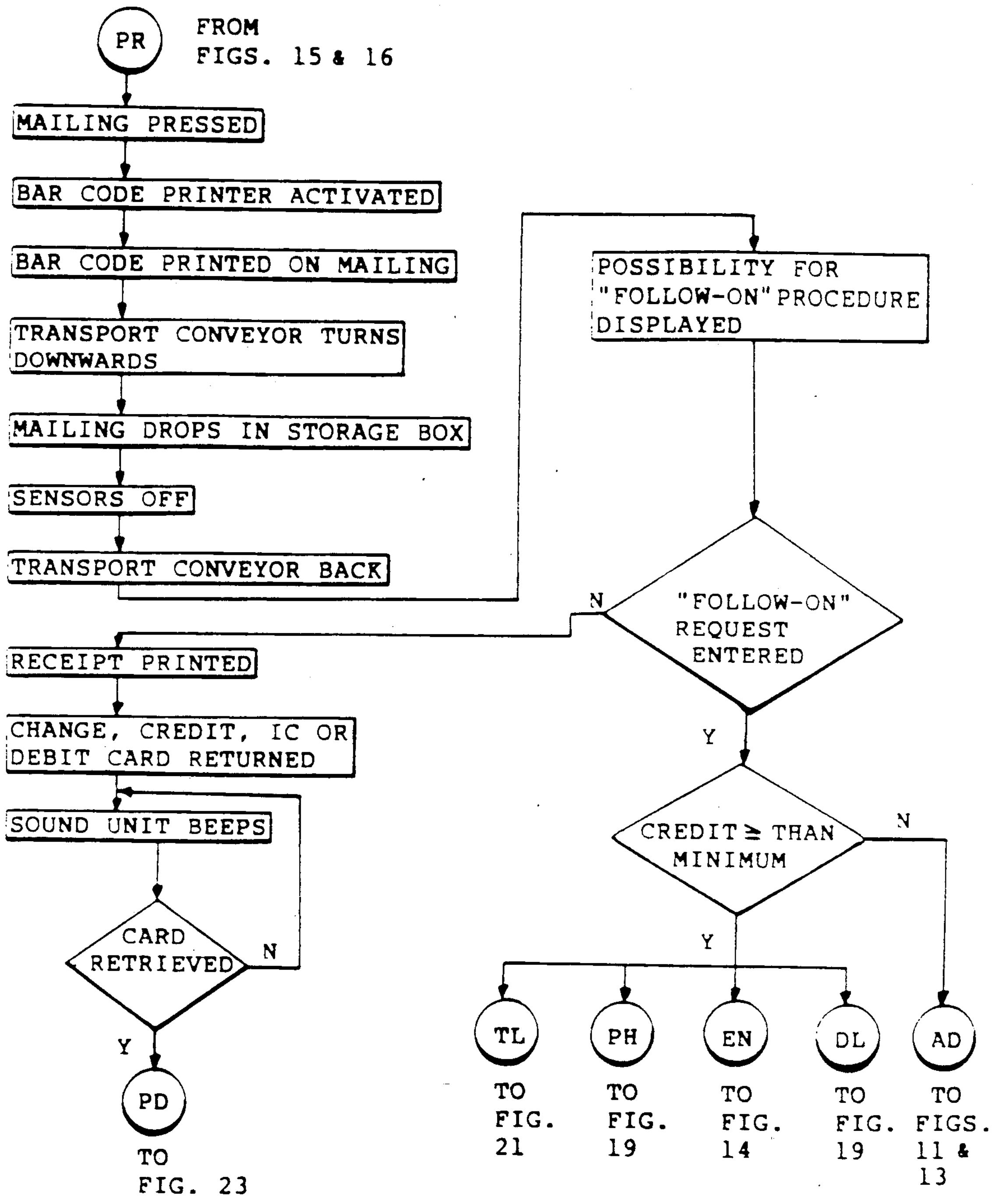

After the charge is paid by any of these means, the machine continues the procedure, as shown in FIG. 17, by activating the mailing pressing unit's electric motor 14, FIGS. 3, 4 and 6, which, by using the transmission mechanism 15, pushes forward the transparent pressing panel 16. According to the process of the present invention, the panel 16 presses the mailing to the insertion slot's rear wall 121 and firmly secures it there so that the rear side of the mailing leans against printing window 122, FIGS. 4, 5 and 7, in a flat fashion so that the bar code can be printed. Simultaneously, the entered destination data is converted into a chosen form of laser readable bar code and when the mailing is pressed, the thermal transfer printing head 21, shown in FIGS. 3, 4 and 5 prints the bar code on the part of the mailing which leans against the printing window 122 as shown in FIGS. 4, 5 and 7.

As shown in FIG. 5, the thermal transfer printing configuration comprises four lateral holders built on the machine's base, wherein the two holders 22 are used to support the configuration carriers 18 which are driven up and down over the two indented holders 19 by indented axle built-in stepping motor 17. As shown in FIG. 5, the configuration further comprises a stepping motor 20 which over supporting bars built-in two said carriers 18, drives the thermal transfer printing head 21 left and right. The bar code is printed by the head 21 during its left to right movement. When the head 21 reaches the right printing margin, the carriers 18 move one step downward and carry the head 21 to the next line printing position. According to the described procedure, the bar code is printed on the stationary mailing by moving the printing head 21 in all four possible directions.

As shown in FIG. 8, when using alphanumeric type bar code, the country code can be printed as a combination of two letters (e.g., D for Federal Republic of Germany), the zip code in numerals (e.g., 2000 for Hamburg in FRG and 13 for certain section of Hamburg), and the special request code as a single letter (e.g., R for registered mail) with the assumption that when a special request is entered, the machine automatically prints an identification number (e.g., 000A). The identification code is printed using alphanumeric combinations starting with zeros and terminating with Zs (i.e., from 0000 to ZZZZ). These alphanumeric combinations yield 36 to the "nth" power combination where "n" can be determined in accordance with requirements. An example of a bar code for a mailing sent by regular mail is shown in FIG. 9. Such bar code consists of a country of destination code (U.S. for U.S.A.) and zip code. The date of acceptance and postage paid can also be printed in human readable characters under the bar code if required.

It is to be understood that any type of laser readable bar code can be used and arranged in any form depending on which code and arrangement is proven to be the most suitable for the purposes of later tracking and scanning. Considering the fact that not all countries have numerical zip codes and that the country code and special request code can be simply formed as a combination of letters, alphanumeric CODE-39 as shown appears to be the most suitable. It is also to be understood that some other printing means can be used instead of the thermal transfer printing head which seems to be the most suitable considering the costs and the bar code quality required.

After the bar code printing procedure is completed, the printing head 21 returns to its starting position and the pressing panel 16 returns backward, leaving the mailing on transport conveyor 25 which, according to the process of the invention as shown in FIG. 17, is driven downward by the electric motor 27, shown in FIGS. 3, 4 and 6. This causes the mailing on transport conveyor 25 to drop inside a storage box (not shown) through mailing drop 28 shown in FIG. 3. Electric motor 27, mounted on insertion slot's rear wall, turns the entire transport conveyor configuration, which comprises transport conveyor 25, electric motor 23 and cylinders 29, shown in FIGS. 3, 4, 6 and 7, up and down. Within a predetermined period of time after the mailing disappears from the sight of photosensors 30 and 31, electric motor 27 turns the conveyor configuration back to its starting position.

Figure 23:
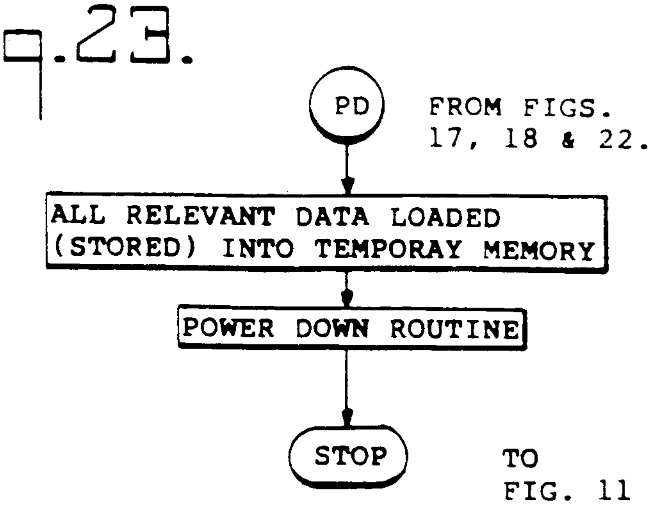

Simultaneously, the machine displays instructions on how one can continue the process by entering directions for a "follow on" procedure which can be entered when another of the machine's services is required as shown in FIG. 17. If no "follow on" directions are entered, the machine continues the procedure by printing and dispensing a receipt from its dot matrix printer 5 in the case of a mailing with a special request, taking the charged amount from escrow and returning the change or the card, FIG. 17, and loading or transferring the relevant data as shown in FIG. 23. The machine can either load all relevant data on a disk in its disk drive unit 11, FIG. 4, for later use or, when connected to some external database, transfer it to that database for later use.

Another function of the present invention is as a pay-phone device wherein the same previously described payment accepting and displaying means are used. Referring now to FIG. 1, there is shown a phone handle 10 hung on machine housing 1, comprising a phone unit connected to a phone line through the housing 1 and including a dialing keyboard inside its middle section. Referring now to FIG. 11, if there is no minimum amount required for using the machine as a payphone device, as soon as any amount is inserted, the customer can pick up the phone handle 10 and get a dial tone. For all other payment means, the card validity checking procedure corresponds to the one previously described for the machine's mail collection function and as shown in FIGS. 12 and 13.

Once a dial tone is obtained, the credit in escrow or on a debit card, or the confirmation for the use of a credit or IC card is displayed, as shown in FIG. 19, and the machine continues the procedure by displaying instructions on how to dial the desired number. When the customer starts to dial the desired number, the number is permanently displayed as dialed in order to avoid the dialing of a wrong number. The machine continues by displaying information on whether the number was connected and instructions on how to repeat the dialing procedure if the desired number is not obtained.

Figure 20:
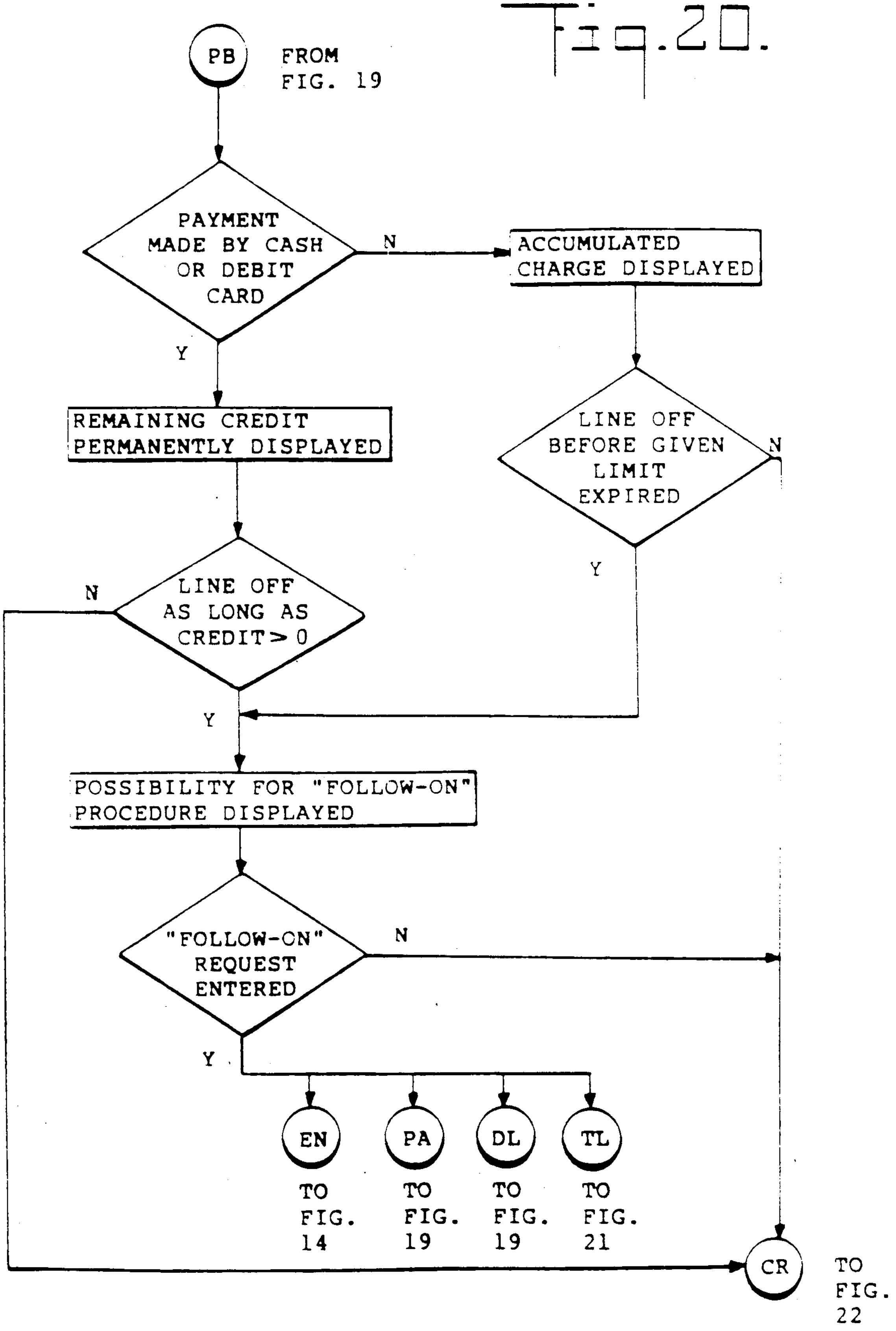
Figure 22:
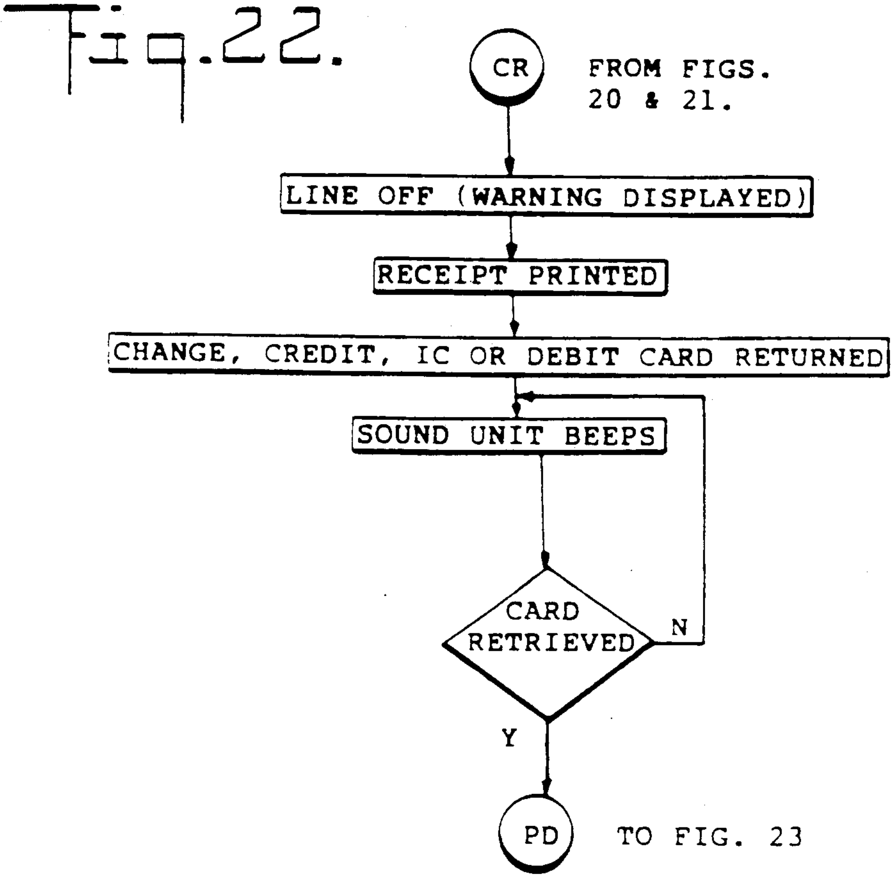

After the desired number is connected and if the payment was made by cash or through a debit card, the remaining credit is permanently displayed and the line remains connected for as long as the credit equals zero, as shown in FIG. 20. If the payment was made by a credit or IC card, the accumulated charge is permanently displayed and the line can be disconnected if a certain given limit is reached. Referring now to FIG. 20, if the line is disconnected by the customer before the credit equals zero or the limit is not reached, the customer has the opportunity to enter directions for a "follow on" procedure before any change from escrow or a card is returned, as shown in FIG. 22, after which the machine continues the procedure as shown in FIG. 23.

Assuming that the present invention is connected to some external database, the invention can also be used as a data listing and data entry device which uses the same payment making, data entering, data displaying, and data printing means as discussed previously. Referring now to FIGS. 11, 12, and 13, the payment procedure for an initial minimum amount corresponds to the one previously described for the machine's use as a mail collecting device. As shown in FIG. 19, when a customer enters the direction that a connection with a database is desired, the information on how to obtain a connection with that certain database is displayed on LCD 8. The payment procedure in this case corresponds to the one described for use of the machine as a pay-phone device, with the assumption that the charge per time unit (seconds) is higher than in the previous case. Various data from numerous databases can be listed, such as data from phonebooks, Yellow Pages, Thomas Catalogs, etc., and each set of data can be printed on the machine's dot matrix printer 5 and dispensed to the customer if such an instruction is entered on the machine's keyboard 6.

In addition to the data listing procedure, and when allowed by the particular database process, the customer can enter data into the database by using the machine's keyboard 6. Different reservation, purchasing, or advertising procedures can be performed by using this process which allows for convenient and economical access to various databases for the general public.

Figure 21:
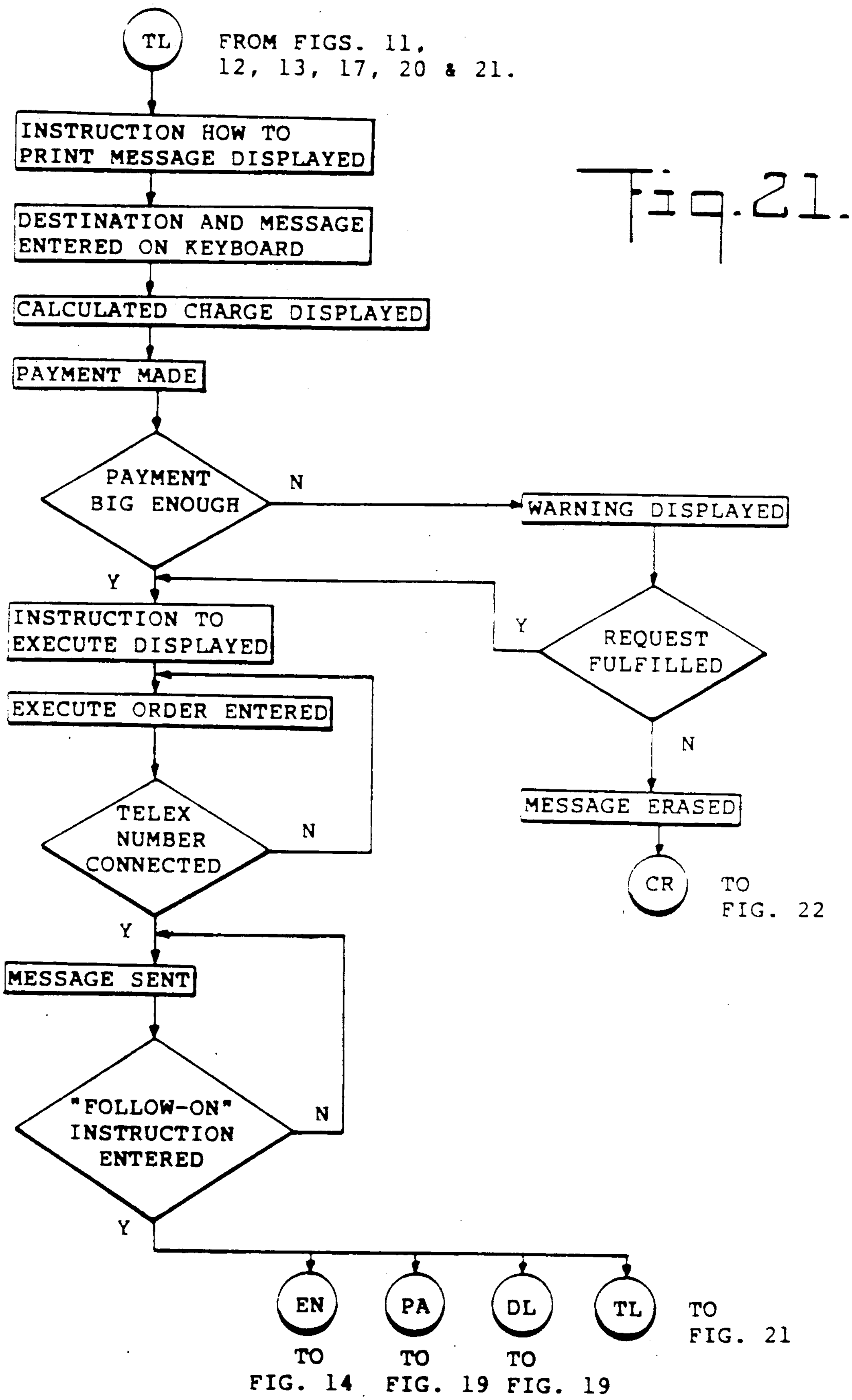

If connected to a telex line, the present invention can also be used as a telex sending device for the purpose of sending messages to any desired telex number. The same payment making, data entering, data displaying, and printing means as described previously can be used. Referring now to FIGS. 11, 12, and 13, the payment procedure for an initial minimum amount corresponds to the procedure previously described for the machine's other functions. If the customer enters an instruction that a telex connection is desired, instructions on how to print a message and the destination are displayed on LCD 8 as shown in FIG. 21. The customer enters a message and destination number which are simultaneously displayed on LCD 8 and which can be corrected before entering the instruction that the message is completed.

Referring again to FIG. 21, according to the length of the entered message and its destination, the charge is calculated and displayed for the customer together with a request for an additional amount of payment if the amount in escrow is not sufficient to cover the charge. In the case of a debit card payment, a warning is also displayed and if the request is not fulfilled following the displayed warning, the message is erased and the inserted amount or the card are returned according to the procedure shown in FIG. 22. If the payment is correctly made, instructions on how to enter an execute order are displayed as shown in FIG. 21 and upon this order, the machine automatically dials the desired number and sends the entered message.

If the desired destination number is not available, the machine continues the dialing procedure for a certain period of time while keeping the message memorized until it determines that the number is not obtainable, upon which time the message is erased and the cash or card returned as shown in FIG. 22. When the desired number is connected, the message is sent and erased from the machine's memory. If, however, the customer wants the message to be printed and has previously entered this instruction, the machine prints the message on its dot matrix printer 5 and dispenses it to the customer as it is being sent. Change from escrow or the inserted card is returned according to the procedure shown in FIG. 22 unless a "follow on" direction is entered by the customer.

In accordance with the present invention, the data storing or forwarding procedures and the change or card returning procedures are identical, regardless of the machine's function, to those shown in FIGS. 22 and 23. According to the process of the present invention, in any case when payment is made by a credit or IC card, a receipt for charges paid is printed and dispensed to customer. Also according to the process of the present invention, and regardless of the machine's function or its stage in the procedures, a customer can always correct any entered data immediately by moving the pointer over the displayed text.

It will be understood that the present invention has been described in relation to particular embodiments, herein chosen for the purpose of illustration, and that the claims are intended to cover all changes and modifications, apparent to those skilled in the art, which do not constitute a departure from the scope and spirit of the invention.

What is claimed is:

1. Self-contained apparatus for processing and collecting an item to be mailed comprising:

computer means;

display means coupled to said computer means, said display means displaying information associated with the use of the apparatus such as the instructions for using said apparatus;

receiving means coupled to said computer means for receiving the item to be mailed;

data entry means coupled to said computer means and to said display means for entering data relating to the item to be mailed, such as the address to which said item is to be mailed;

weighing means coupled to said computer means and to said receiving means for securely weighing said item to be mailed;

determining means including said computer means and coupled to said data entry means and to said weighing means for determining the required postage for said item to be mailed;

payment means for accepting and verifying payment for said postage including said computer means and coupled to said display means, to said data entry means, and to said determining means;

means coupled to said computer means for providing machine readable information concerning the item to be mailed on the item to be mailed, such as the zip code to which said item is to be mailed;

transport means coupled to said computer means for transporting the item to be mailed from said receiving means to a storage area for subsequent pick up; and means coupled to said transport means for moving said transport means to drop said item in said storage area and moving said transport means to its original position after said item has been dropped in said storage area.

2. The apparatus according to claim 1 wherein said display means are initially activated by a sensor detecting a person in proximity to said apparatus.

3. The apparatus according to claim 1 wherein said receiving means include means for positioning said item to be mailed within said apparatus.

4. The apparatus according to claim 1 wherein said data entry means include an alphanumerical keyboard coupled to said computer means and to said display means.

5. The apparatus according to claim 1 wherein said payment accepting and verifying means include:

means including said computer means and coupled to said display means and to said determining means for detecting the presence of currency, for validating said currency, for counting said currency, and for returning change from said currency; and means including said computer means and coupled to said display means, to said data entry means, and to said determining means for detecting the presence of debit, credit, or IC cards, for reading said cards, for validating said cards, for charging said cards, and for returning said cards.

6. The apparatus according to claim 1 wherein said information providing means include:

means including said computer means for converting the information concerning the item to be mailed into laser readable bar code; and means for printing said laser readable bar code directly on the item to be mailed.

7. The apparatus according to claim 6 wherein the information concerning the item to be mailed converted into said laser readable bar code includes information such as zip code, country code or special requests.

8. The apparatus according to claim 1 further comprising means coupled to said computer means for printing and dispensing human readable text detailing the transaction performed by said apparatus.

9. The apparatus according to claim 1 further comprising a telephone installation including:

means coupled to said computer means and to said display means for placing a telephone call; and means including said computer means and coupled to said display means and to said payment means for calculating a charge for said telephone call, said payment means being adapted to accept and verify payment for said telephone call charge.

10. The apparatus according to claim 1 further comprising a data listing and interacting capability including:

connector means coupled to said computer means and to said display means for connecting said apparatus to a database;

means coupled to said computer means, to said display means, and to said connector means for interacting with said database;

means coupled to said computer means, to said connector means, and to said interacting means for listing and printing data from said database; and means including said computer means and coupled to said display means and to said payment means for calculating a charge for the use of said data listing and interacting capability, said payment means being adapted to accept and verify payment for said data listing and interacting capability charge.

11. The apparatus according to claim 1 further comprising a telex message sending capability including:

means coupled to said computer means and to said display means for accepting and sending a telex message; and means including said computer means and coupled to said display means and to said payment means for calculating a charge for the sending of said telex message, said payment means being adapted to accept and verify payment for said telex message sending charge.

12. Self-contained apparatus for processing and collecting an item to be mailed and for telecommunicating comprising:

computer means;

display means coupled to said computer means, said display means displaying information associated with the use of the apparatus such as the instructions for using said apparatus;

receiving means coupled to said computer means for receiving the item to be mailed;

data entry means coupled to said computer means and to said display means for entering data relating to the item to be mailed, such as the address to which said item is to be mailed;

weighing means coupled to said computer means and to said receiving means for securely weighing said item to be mailed;

determining means including said computer means and coupled to said data entry means and to said weighing means for determining the required postage for said item to be mailed;

payment means for accepting and verifying payment for said postage including said computer means and coupled to said display means, to said data entry means, and to said determining means;

means coupled to said computer means for providing machine readable information concerning the item to be mailed on the item to be mailed, such as the zip code to which said item is to be mailed;

transport means coupled to said computer means for transporting the item to be mailed from said receiving means to a storage area for subsequent pick up;

means coupled to said transport means for moving said transport means to drop said item in said storage area and moving said transport means to its original position after said item has been dropped in said storage area;

telephone means coupled to said computer means and to said display means for placing a telephone call and means including said computer means and coupled to said display means and to said payment means for calculating a charge for said telephone call, said payment means being adapted to accept and verify payment for said telephone call charge;

connector means coupled to said computer means and to said display means for connecting said apparatus to a database;

means coupled to said computer means, to said display means, and to said connector means for interacting with said database;

means coupled to said computer means, to said connector means, and to said interacting means for listing and printing data from said database;

means including said computer means and coupled to said display means and to said payment means for calculating a charge for the use of said data listing and interacting capability, said payment means being adapted to accept and verify payment for said data listing and interacting capability charge; and means coupled to said computer means and to said display means for accepting and sending a telex message and means including said computer means and coupled to said display means and to said payment means for calculating a charge for the sending of said telex message, said payment means being adapted to accept and verify payment for said telex message sending charge.

13. The apparatus according to claim 12 wherein said information providing means include:

means including said computer means for converting the information concerning the item to be mailed into laser readable bar code; and means for printing said laser readable bar code directly on the item to be mailed.

14. The apparatus according to claim 13 wherein the information concerning the item to be mailed converted into said laser readable bar code includes information such as zip code, country code or special requests.

15. A method of processing and collecting with, and otherwise operating a self-contained computerized apparatus, said apparatus comprising an insertion slot door, a transport conveyor and a storage area, comprising the steps of:

activating said apparatus by displaying information associated with the use of said apparatus when detecting a person in proximity to said apparatus;

receiving an item to be mailed through said insertion slot door;

positioning the item to be mailed inside said apparatus on said transport conveyor;

weighing the item to be mailed;

accepting information relating to the item to be mailed such as the destination of the item to be mailed;

determining the required postage for the item to be mailed;

accepting and verifying payment for said postage;

printing information related to the item to be mailed in a machine readable bar code on the item to be mailed;

moving said transport conveyor causing the item to be mailed to be dropped into said storage area; and moving said transport conveyor to its original position a predetermined amount of time after said item to be mailed was dropped in said storage area.

16. The method according to claim 15 further comprising the steps of:

connecting a telephone call;

calculating a charge for said telephone call; and accepting and verifying payment for said telephone call charge.

17. The method according to claim 15 further comprising the steps of:

connecting said computerized apparatus to a database;

interacting with said database;

calculating a charge for said database interaction; and accepting and verifying payment for said database interaction charge.

18. The method according to claim 15 further comprising the steps of:

sending a telex message;

calculating a charge for the sending of said telex message; and accepting and verifying payment for said telex message sending charge.

19. The method according to claim 15 wherein the step of printing information further comprises the step of converting said information, which includes a zip code, a country code or special requests, into laser readable bar code prior to printing said information on the item to be mailed.

* * * * *